Patented Mar. 10, 1942

2,276,023

UNITED STATES PATENT OFFICE 2,276,023

PRODUCTION OF 1.3-BUTADIENE

Martin Mueller-Cunradi, Ludwigshafen-on-the-Rhine, Adolf Cantzler, Mannheim, and Hans Krekeler, Ludwigshafen-on-the-Rhine, Germany, assignors, by mesne assignments, to Jasco, Incorporated, a corporation of Louisiana No Drawing. Application July 7, 1939, Serial No. 283,184. In Germany July 12, 1938

4 Claims. (Cl. 260—680)

The present invention relates to the production of 1.3-butadiene.

It is already known that the splitting off of hydrogen chloride from n-dichlorbutane in the gas phase is preferably carried out under reduced pressure or in the presence of diluents. As diluent gas, nitrogen has already been proposed, the use of which is troublesome however because the butadiene is obtained in the final gas in great dilution and first the hydrogen chloride must be separated and then the butadiene must be separated from the nitrogen by special measures, as for example liquefaction or washing with cuprous salt solutions.

It has also been proposed in the preparation of butadiene from n-dichlorbutane to use steam alone as diluent gas, but in this case there are obtained considerable amounts of dilute aqueous hydrochloric acid because fresh water is constantly being brought into the process and this forms aqueous hydrochloric acid with the hydrogen chloride split off. The working up of this dilute hydrochloric acid is troublesome and expensive.

We have now found that the preparation of butadiene by splitting off of hydrogen chloride from dichlorbutane in the gas phase, if desired in the presence of catalysts, can be rendered advantageous industrially by using the n-dichlorbutane in dilution with aqueous hydrochloric acid. The hydrogen chloride split off is then obtained in the form of a highly concentrated hydrochloric acid readily capable of being worked up and no additional amounts of dilute hydrochloric acid difficult to work up are obtained. Moreover the separation of the butadiene formed is especially simple. Contrary to expectation, the presence of hydrogen chloride in the initial mixture does not influence the speed or completeness of the splitting off of hydrogen chloride.

The process is preferably carried out by leading vaporous n-dichlorbutane, which may be obtained by treating n-butylene with chlorine at ordinary temperature or by di-chlorination of n-butane or by monochlorination of n-butylchloride, with the vapor of constant boiling, about 20 per cent hydrochloric acid with a high speed of flow through a reaction room, preferably a tube or a plurality of tubes heated to a temperature of at least 500° C. but below the temperature at which substantial splitting of the carbon chain occurs. The actual upper temperature limit depends on the speed of flow chosen. When passing the vapors rapidly enough through the reaction room so that the reaction time is short, the temperature may even be raised up to 750° C., especially when using empty reaction vessels.

The reaction vessels may be charged with catalysts capable of splitting off hydrogen chloride, as for example with a body having a large surface, such as silicic acid gel, active carbon, alumina or pumice stone, which if desired is activated with a chloride of a polyvalent metal which is not volatile under the reaction conditions, such as calcium or magnesium chloride.

After it leaves the reaction vessel, the reaction gas is cooled, whereby the introduced hydrochloric acid, which has been strengthened by the hydrogen chloride split off during the reaction, separates as highly concentrated hydrochloric acid. The amount of the hydrochloric acid introduced as diluent may be so proportioned that by cooling the reaction gas an about 36 per cent acid is obtained. Less hydrochloric acid, for example only a quarter, a third or a half of the amount necessary to form highly concentrated hydrochloric acid with the hydrogen chloride to be split off may be used, however, and then, after cooling the reaction gas, the undissolved hydrogen chloride may be washed out in a washing vessel with 20 per cent hydrochloric acid. The cooling and washing may also be combined in one and the same vessel, as for example in a tower, the liquid hydrochloric acid used for the washing thus serving simultaneously as a cooling agent.

In this way a highly concentrated hydrochloric acid is obtained which is freed from organic impurities and then reconverted by heating into 20 per cent, constant-boiling acid. The gaseous hydrogen chloride thus obtained may be exploited as such or also converted into chlorine by oxidation; the latter may then be used for the preparation of butylene chloride from butylene. The residual constant-boiling aqueous hydrochloric acid is then vaporized and used as diluent gas and/or used for washing the reaction gases.

Depending on the pressure at which the recovery of the hydrogen chloride from the highly concentrated acid is carried out, a more or less highly concentrated, constant-boiling aqueous hydrochloric acid is obtained. Since generally speaking there is no need to work under other than normal pressure, the constant-boiling acid has a concentration of about 20 per cent. In other words the process works under normal conditions with 20 per cent hydrochloric acid. Should it be necessary, however, to carry out the process under pressure, a correspondingly more highly concentrated, constant-boiling hydrochloric acid may also be used. The new method of working permits, when working under ordinary pressure, of working with one and the same amount of about 20 per cent hydrochloric acid which is led continuously in circulation through the reaction vessel, strengthened therein and diluted again by heating. Additional amounts of 20 per cent hydrochloric acid, which could hardly be directly used industrially, cannot be formed.

The following examples will further illustrate how this invention may be carried out in practice but the invention is not restricted to these examples.

Example 1

The reaction vessel consists of a tube, capable of being heated, 2 metres long and 45 millimetres in internal diameter which is of acid-proof material and filled with 100 cubic centimetres of silicic acid gel. Through this reaction vessel there are led per hour at 650° C. and normal pressure 2780 grams of n-dichlorbutane and 2200 grams of vaporized 20 per cent hydrochloric acid. The effluent end gas, which contains only butadiene, steam and hydrogen chloride in addition to small amounts of saturated and unsaturated chlorine compounds, is washed in a tower with 3600 grams of 20 per cent hydrochloric acid at ordinary temperature. There are thus obtained 945 grams of butadiene and 7240 grams of 36 per cent hydrochloric acid, corresponding to a yield of 80 per cent of butadiene and 90 per cent of hydrogen chloride with reference to the dichlorbutane introduced.

1440 grams of gaseous hydrogen chloride are then expelled by heating from the 36 per cent hydrochloric acid; there remain 5800 grams of 20 per cent hydrochloric acid of which 2200 grams are used again as diluent and 3600 grams as washing liquid.

By using in the same way, instead of the 2200 grams of 20 per cent hydrochloric acid, the corresponding amount of steam (1980 grams) as guide gas and working in the same manner as above described, it is necessary, since only 1120 grams of hydrogen chloride are dissolved in the added water, still to use 1280 grams of 20 per cent hydrochloric acid to wash out the residual hydrogen chloride (320 grams). From the whole of the resulting concentrated (36 per cent) hydrochloric acid (4700 grams) it is possible by heating to recover in a form which can be readily worked up industrially only 950 grams of hydrogen chloride, i. e. only about 66 per cent of the hydrogen chloride formed. If 1280 grams of the 20 per cent hydrochloric acid remaining after heating (3750 grams) be used again for washing fresh reaction gas, there still remain 2470 grams of 20 per cent hydrochloric acid from which the hydrogen chloride can be recovered only with trouble and the working up of which constitutes a measure additional to those employed according to this invention.

Example 2

Through an empty, acid-proof cast-iron pipe capable of being heated and having a length of 1 metre and an internal diameter of 45 millimetres there are led at about 700° C. and at normal pressure 265 grams per hour of n-dichlorbutane, such as is obtained by adding on chlorine to normal butylene in the cold, and 275 grams per hour of vaporized 20 per cent hydrochloric acid. The effluent final gas, which in addition to butadiene contains saturated and unsaturated chlorine compounds, steam and hydrogen chloride, is washed in a tower with such an amount of 20 per cent hydrochloric acid at ordinary temperature that a 36 per cent hydrochloric acid is formed. From the residual gas there are obtained 70 grams of butadiene.

Hydrogen chloride may be expelled from the 36 per cent hydrochloric acid in the manner described in Example 1. The remaining 20 per cent hydrochloric acid is again used as diluent and as washing liquid.

What we claim is:

1. A process for the production of butadiene which comprises leading a mixture of n-dichlorbutane and vaporized hydrochloric acid of constant boiling point through a reaction vessel heated to temperatures exceeding 500° C., but below those at which substantial splitting of the carbon chain occurs.

2. A process for the production of butadiene which comprises leading a mixture of n-dichlorbutane and vaporized hydrochloric acid of constant boiling point through a reaction vessel charged with a catalyst promoting the splitting off of hydrogen chloride and heated to temperatures exceeding 500° C., but below those at which substantial splitting of the carbon chain occurs.

3. A process for the production of butadiene which comprises leading a mixture of n-dichlorbutane and vaporized hydrochloric acid of constant boiling point through a reaction vessel heated to temperatures exceeding 500° C., but below those at which substantial splitting of the carbon chain occurs, condensing liquid hydrochloric acid from the reaction gases, heating it until constant boiling hydrochloric acid is obtained and re-using this acid in the process.

4. A process for the production of butadiene which comprises leading a mixture of n-dichlorbutane and vaporized hydrochloric acid of constant boiling point through a reaction vessel charged with a catalyst promoting the splitting off of hydrogen chloride and heated to temperatures exceeding 500° C., but below those at which substantial splitting of the carbon chain occurs, condensing liquid hydrochloric acid from the reaction gases, heating it until constant boiling hydrochloric acid is obtained and re-using this acid in the process.

MARTIN MUELLER-CUNRADI.
ADOLF CANTZLER.
HANS KREKELER.